United States Patent
Suryanarayanan et al.

(10) Patent No.: US 10,409,625 B1
(45) Date of Patent: Sep. 10, 2019

(54) VERSION MANAGEMENT FOR HOSTED COMPUTING WORKSPACES

(71) Applicant: Amazon Technologies, Inc., Reno, NV (US)

(72) Inventors: Deepak Suryanarayanan, Seattle, WA (US); Malcolm Ah Kun, Seattle, WA (US); Colin Brace, Seattle, WA (US); Supreeth Sheshadri, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 148 days.

(21) Appl. No.: 14/029,714

(22) Filed: Sep. 17, 2013

(51) Int. Cl.
*G06F 8/61* (2018.01)
*G06F 11/36* (2006.01)
*G06F 8/656* (2018.01)
*G06F 9/455* (2018.01)

(52) U.S. Cl.
CPC .......... *G06F 9/45533* (2013.01); *G06F 8/656* (2018.02); *G06F 11/3672* (2013.01); *G06F 8/63* (2013.01); *G06F 9/45558* (2013.01); *G06F 2009/4557* (2013.01)

(58) Field of Classification Search
CPC ...... G06F 8/65; G06F 9/4416; G06F 9/45533; G06F 8/63; G06F 9/45558; G06F 9/4451; H04L 63/105; H04L 29/06; H04L 67/14
See application file for complete search history.

(56) References Cited

U.S. PATENT DOCUMENTS

| 2008/0028391 | A1* | 1/2008 | Nallipogu | G06F 8/61 717/174 |
| 2008/0271017 | A1* | 10/2008 | Herington | G06F 9/45558 718/1 |
| 2009/0164994 | A1* | 6/2009 | Vasilevsky et al. | 718/1 |
| 2010/0275204 | A1* | 10/2010 | Kamura | G06F 9/45533 718/1 |

(Continued)

FOREIGN PATENT DOCUMENTS

CN 102333065 A * 1/2012

OTHER PUBLICATIONS

Dai, Yuanshun. English translation of "CN102333065A": Cloud interaction protocol design. Chinese Patent Publication. Jan. 25, 2012.*

(Continued)

*Primary Examiner* — Lewis A Bullock, Jr.
*Assistant Examiner* — Gilles R Kepnang
(74) *Attorney, Agent, or Firm* — Davis Wright Tremaine LLP (57) ABSTRACT

Changes to virtual workspaces, such as virtual desktops, can be managed for various users by retaining a copy of a machine image for a current workspace in addition to a new machine image for a new workspace with the changes. If compliance issues are detected, or if a user indicates an issue or desire to return to the previous workspace, a new machine instance can be launched that utilizes the previous machine image, simplifying the rollback process and enabling the user to quickly return to the previous workplace state. In (Continued)

some embodiments, a snapshot of the user data can be taken at the time of a workspace change, such that if the workspace is rolled back to a previous version, the data from that point in time can be attached in order to prevent loss or damage to that data as a result of the change.

22 Claims, 7 Drawing Sheets

(56) References Cited

U.S. PATENT DOCUMENTS

| | | | |
|---|---|---|---|
| 2011/0055299 A1* | 3/2011 | Phillips | G06F 9/45533 707/827 |
| 2011/0197051 A1* | 8/2011 | Mullin | G06F 8/63 713/1 |
| 2011/0231844 A1* | 9/2011 | Ben-Shaul et al. | 718/1 |
| 2012/0174096 A1* | 7/2012 | Conover | 718/1 |
| 2012/0185528 A1* | 7/2012 | Jaudon | G06F 9/54 709/203 |
| 2012/0191929 A1* | 7/2012 | Zietzke | G06F 9/45533 711/162 |
| 2013/0047160 A1* | 2/2013 | Conover | G06F 8/65 718/1 |
| 2013/0066945 A1* | 3/2013 | Das et al. | 709/203 |
| 2013/0073703 A1* | 3/2013 | Das | H04L 67/10 709/223 |
| 2013/0086585 A1* | 4/2013 | Huang | H04L 67/14 718/1 |
| 2013/0212579 A1* | 8/2013 | Ben-Shaul | G06F 9/4451 718/1 |
| 2013/0247020 A1* | 9/2013 | Fontignie | G06F 8/63 717/168 |
| 2014/0109089 A1* | 4/2014 | Zhang | G06F 9/455 718/1 |
| 2014/0149983 A1* | 5/2014 | Bonilla | G06F 9/45558 718/1 |
| 2014/0157266 A1* | 6/2014 | Fletcher | G06F 11/1484 718/1 |
| 2014/0189677 A1* | 7/2014 | Curzi et al. | 717/171 |
| 2014/0201725 A1* | 7/2014 | Tian | G06F 8/63 717/169 |
| 2014/0237464 A1* | 8/2014 | Waterman | G06F 8/65 717/172 |
| 2014/0289737 A1* | 9/2014 | Anderson | G06Q 10/0633 718/105 |
| 2015/0019733 A1* | 1/2015 | Suryanarayanan | H04L 41/0806 709/226 |
| 2015/0033223 A1* | 1/2015 | Chari | H04L 63/105 718/1 |

OTHER PUBLICATIONS

Brinkmann, Dan. "Application and OS updates for virtual desktops: Not so simple". Feb. 2013. TechTarget. (Year: 2013).*

Kumar, Sunil. "How do I update my base images in XenDesktop?" Aug. 15, 2008. Citrix. (Year: 2008).*

* cited by examiner

VERSION MANAGEMENT FOR HOSTED COMPUTING WORKSPACES

BACKGROUND

An increasing amount of computing functionality is capable of being performed remotely. In many instances, a user can login to a virtual desktop application on a computing device in order to be able to access applications and data from a desktop application executing on a remote computer. The desktop application will typically involve an operating system and a number of applications configured to execute on that operating system. In many instances, it can be desirable to update the operating system to a new version, such as to apply fixes or simply to have a more current version. With each change in the operating system, a user typically has to go through a number of compatibility checks in order to ensure that the applications are compatible with the updated operating system. The process of checking compatibility of each application can be cumbersome, and it can be difficult to detect all potential incompatibilities. These updates can occur relatively frequently, such that a user can expend a significant amount of effort determining compatibility. If an incompatibility is found, such as where an application no longer executes as intended, it can be necessary to undo the version upgrade, or otherwise adjust the software for the virtual desktop in order to get the application (and other applications) executing properly again. In environments such as enterprise environments, where there can be many different applications of different versions and configurations for various users, this can be an expensive and time consuming endeavor, which can prevent software updates from being applied as quickly as they could in order to potential issues to be discovered by others and addressed in a subsequent update.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to managing changes to software and/or hardware in an electronic environment. In particular, various embodiments enable changes to virtual machines, virtual instances, virtual desktops, or other such software environments and/or workspaces through utilization of multiple virtual machine images. A new virtual machine image can be generated when one or more changes is to be performed, and another virtual machine image can be retained that corresponds to a virtual workspace, for example, before the change. When a user logs in after the change, a new virtual machine can be launched that includes the changes represented in the new virtual machine image. If a compliance check fails, the user indicates an issue with the new workspace, or another such event occurs, a rollback can be performed wherein a new machine instance is launched using the retained machine image from before the change, whereby the user can be quickly returned to the previous state. In at least some embodiments, a snapshot of the user data can be taken at around the time of the change, or at another appropriate time, such that if a rollback occurs, the virtual machine using the previous machine image can utilize the prior state of the user data, preventing loss or contamination of that data as a result of the upgrade attempt.

Various other functions and advantages are described and suggested below as may be provided in accordance with the various embodiments.

Figure 1:
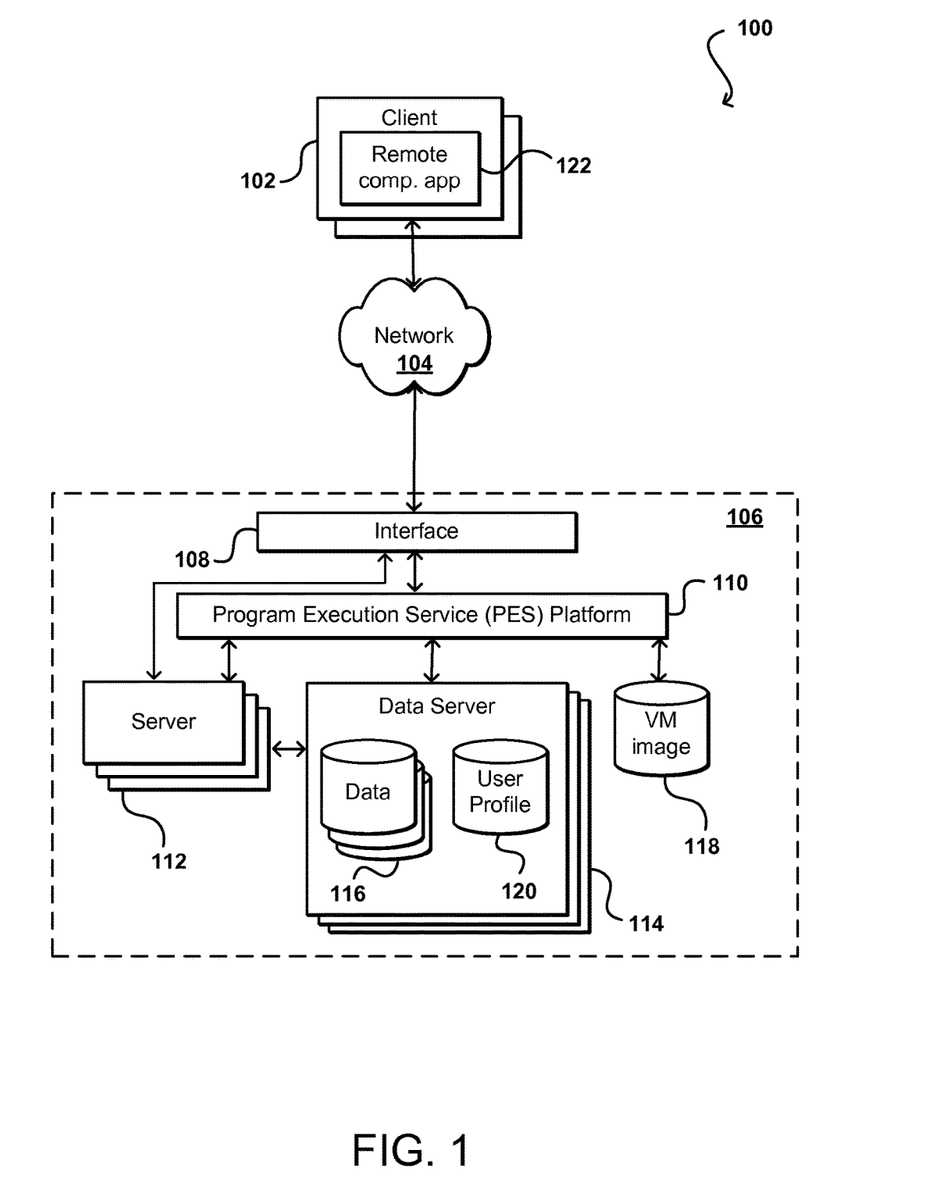
FIG. 1 illustrates an example of an environment in which aspects of the various embodiments can be implemented.

FIG. 1 illustrates an example environment 100 in which a user can utilize a client device 102 to access a remote desktop application, or other such workspace, executing on a server 112, or other such computing device, of a service provider network 106. The client device 102 can be any appropriate computing device capable of requesting, receiving, and/or presenting content, such as may include a thin client device or "dummy terminal," a smart phone, an e-book reader, a tablet computer, a notebook computer, a personal data assistant, a video gaming console or controller, a smart television, a wearable computer (e.g., a smart watch or glasses), or a portable media player, among others. In this example, the client device 102 is in communication with a service provider network 106 via at least one communications network 104. The at least one network can include a wired and/or wireless network, as may include the Internet, a cellular network, a local area network (LAN), an Ethernet, an Intranet, and the like. A user can access a remote computing application 122 executing on the client device 102, for example, in order to access a remote operating system and other applications configured to be executed at least partially in the service provider network 106, but accessible to the user via the client device 102. The client device 102 may have varied local computing resources, such as may include central processing units and architectures, memory, mass storage, graphics processing units, communication network availability and bandwidth, etc.

In various embodiments, the client device 102 can execute a remote computing application 122, which can be configured to request access to a virtual desktop instance hosted by the service provider network 106. The remote computing application 122 can also manage a remote computing session between the client device 102 and the service provider computer network 106. The service provider network 106 in this example includes a program execution service (PES) platform 110, which can include one or more devices, components, systems, and/or services for supporting a program execution service. The PES platform 110 in this example corresponds to a logical association of one or more computing and/or data centers associated with a service provider (not shown). The PES platform 110 can be associated with a number of servers 112, or other such computing devices, each configured and/or operable to host one or more virtual desktop instances for each of one or more users. A server 112 in the service provider network 106 can host a virtual desktop instance in at least one embodiment by executing a virtual machine on a physical device. The virtual machine, in turn, can execute an instance of an operating system (OS) and application software to create a virtual desktop instance. Each virtual desktop instance managed by the PES 110 can be accessed by one or more client computing devices, such as the client device 102 illustrated, as may contact the environment using one or more application programming interfaces (APIs) or other such interfaces of an interface layer 108 of the provider network. The application servers in some embodiments can be associated with private network addresses, such as IP addresses, within the service provider network such that the servers are not be directly accessible by the client computing device 102. The virtual desktop instances may be associated with public network addresses that may be made available by a gateway at the edge of the service provider computer network 106, such as may be part of the interface layer 108. Accordingly, the virtual desktop instances may be directly addressable by client computing devices via the public network addresses. One skilled in the relevant art will appreciate that each server 112 can include physical computing device resources and software to execute the multiple virtual desktop instances or to dynamically instantiate virtual desktop instances. Such instantiations can be based on a specific request, such as from the client computing device 102.

The service provider network can also include one or more data servers 114, as may be part of a storage service platform in at least some embodiments. The data servers 114 can be used to store data or other electronic content generated, or utilized by, the virtual desktop instances. The data and/or content can be stored in one or more data stores 116, as may be distributed across one or more physical devices, which can be accessible via the servers 112 and/or data servers 114, among other such components. Data generated or utilized by the virtual desktop instances for a user may be based, at least in part, on interactions between the client computing device 102 and the PES 110 via one or more remote computing sessions. The data servers 114 can logically organize and maintain information associated with a virtual desktop instance hosted by one of the servers 112. The information associated with a virtual desktop instance can include, but is not limited to, user preferences, information associated with the execution of program data, user content, references to user content, and the like. For example, folders used by the user to store music, files, and the like on other storage devices, including through storage service providers, may also be mapped to the virtual instance via references to those storage locations. That is to say, input/output operations, such as requests to open files in these folders, can be redirected to the virtual instance. Thus, when a user attempts to open a file stored in his or her document folder, the request can be redirected by the operating system running in the virtual desktop instance. In addition to the data created by the user, a desktop profile for the user, which may include, for example, configuration information for the desktop such as the background picture, fonts, arrangement of icons, and the like, can also be associated with the user's virtual desktop instance. The service provider computer network 106 can mitigate the effect of failures of the server(s) 112 running the virtual desktop instances or errors associated with the execution of virtual instances on the application server(s) by storing on data servers independent from the application servers. Additionally, the service provider network 106 can facilitate client interaction with multiple virtual instances by maintaining the information for the virtual instances. In some embodiments, if one virtual desktop instance fails, a new instance may be launched, and attached to a data store previously attached to the virtual desktop instance that failed.

The PES platform 110 in some embodiments can maintain a PES repository in one of the data stores 116 for storing data for the various desktop instances. The servers 112 and the data servers 114 may further include additional software and/or hardware components that facilitate communications including, but not limited to, load balancing or load sharing software/hardware components for selecting instances of a virtual machine supporting a requested application and/or providing information to a DNS name server to facilitate request routing.

The service provider network 106 may also include at least one user profile data store 120. The user profile data store 120 may be used to store, for example, various programs to which a user is given access while utilizing a virtual desktop instance. The user profiles stored can also indicate a maximum time or cost associated with the remote computing sessions of different users. The PES platform 110 may take user profiles into consideration when placing and configuring virtual desktop instances. The PES platform 110 may also include, or be connected to, a virtual machine image store 118. The virtual machine image store 118 may include various machine images, each of which can correspond to templates that are not executing on a server. Each such template can include elements or objects such as one or more operating systems without customizations applied per user profiles, and in at least some embodiments can include software and/or desktop configurations customized or configured for various versions, applications, users, or other such aspects as discussed elsewhere herein. In order to launch a virtual machine, for example, a copy of the virtual machine image (i.e., template) is copied to the designated server, for example, and then the software of the virtual machine image is executed on that server using the configuration and/or data specified by the virtual machine image. Once executing, the virtual machine can be accessible by a user or other such entity or component.

In an illustrative embodiment, application servers and data servers are considered to be logically grouped, regardless of whether the components, or portions of the components, are physically separate. For example, a service provider network may maintain separate locations for providing the instances and the storage components. Additionally, although the application servers are illustrated as being logically associated with a PES platform, the application servers can be geographically distributed in a manner to appropriately serve various demographics of its users. Additionally, one skilled in the relevant art will appreciate that the service provider network can be associated with various additional computing resources, such additional computing devices for administration of content and resources, and the like. Various embodiments will be described with regard to the management of virtual desktop instances by a PES platform. Client devices can access the virtual desktop instances during one or more remote computing sessions. A virtual desktop instance can provide a user with all of the capabilities of a client desktop environment but with centralized provisioning of the services accessed by the client.

In a first example, a user can cause the client device 102 to transmit a request to load (or can separately obtain) an application such as a remote computing application 122. Subsequent to the receipt of the request, the client computing device can communicate with a PES platform 110 to start a remote computing session. In one embodiment, the communication between the client device 102 and the PES platform 110 can include the user submitting login information needed to provide for authentication and/or authorization to create and/or access a virtual desktop instance. In other embodiments, communication may also include information identifying resource usage information, processing requirements, or rules regarding the duration or conditions of a remote computing session for the user of the client device. The client device may further communicate various information relating to the device state, including, but not limited to, a current or future availability of device resources (e.g., processing power, memory, storage, network usage, etc.). Using the information received, the PES platform may identify one or more virtual desktop instances for execution in one or more remote computing sessions. In one example, the PES platform can instantiate, or cause to have instantiated, a virtual machine instance on a server 112 in the service provider network 106. The virtual machine instance will generally include an operating system and various software configured to execute on that operating system.

The client device 102 can then establish a remote computing session with the virtual machine, and the user interface of the operating system (e.g., the output of the operating system such as a graphical user interface, sound, etc.) can be sent to the client computing device and presented to the user (e.g., the graphical user interface is rendered on a display of the client computing device). The user interface can take the form of an image to be displayed, graphics information to be rendered, etc. In some embodiments, some, most, or all of the functionality will be executed on one or more of the application servers, and may or may not have any of the functionality executed on the client device. The operating system may use a desktop profile associated with the user and stored on a desktop store accessible by the PES to configure the virtual desktop instance for the user by setting the desktop background, screen saver, desktop layout, pointer preferences, sound settings, and the like. User input such as mouse and keyboard activity can then be sent to the virtual machine and injected into the operating system as if the activity was performed by a user directly at the virtual machine.

The PES platform 110 may receive and/or generate data associated with the interaction of the client device with the associated virtual desktop instance during the remote computing session. The data may include user data and preferences, files, and the like. Upon receiving the data, the PES platform may save the data to the desktop store associated with the virtual desktop instance. In some embodiments, the desktop store may be implemented on a volume, or on another logical block storage device. In some embodiments, the PES may create a backup copy of the data or also store the data to a central repository. The saved data may then be used to restore remote computing sessions that have been interrupted due to a failure, such as a failure of the virtual desktop instance, the server hosting the virtual desktop instance, the network, etc. By saving the user data, the PES platform can provide for the reestablishment of a remote computing session with minimal delay and disruption to a user of a client computing device.

In another illustrative example, a virtual desktop instance may be configured according to a user profile stored at a user profile store 120 of the PES. The configuration of the virtual desktop instance may also be adjusted according to monitored usage of the instance. In some examples, the user profile may be set by an administrator associated with an entity governing the user's use, as may be associated with an administrator console or other such mechanism as discussed elsewhere herein. The user profile may indicate various memory and/or processing requirements associated with the PES devices executing the one or more virtual desktop instances, as well as requirements for those virtual desktop instances. For example, a user profile may indicate the programs to which the user is given access while using a virtual desktop instance. The user profile may also indicate a maximum time or cost associated with the remote computing session. The PES may take a user profile for the user into consideration when placing and configuring the virtual desktop instances. In addition, placement and configuration decisions may also be adjusted based on a user's interaction with the virtual desktop over time.

In another illustrative example, the remote computing session between a client device 102 and the PES platform 110 may be used to provide a version of the virtual desktop instance to be executed on the client device. The version of the instance may be adapted according to one or more of the operating system, the memory, and the processing power specifications of the client computing device. With the adapted version of the virtual desktop instance copied onto the client computing device, the device may continue to interact with the virtual desktop instance even after disconnection from the PES platform. Subsequently, upon reconnecting to the PES platform, a new virtual desktop instance may be synchronized with the previous virtual desktop instance executed on the client computing device.

Although aspects of the embodiments described herein may describe, for the purpose of illustration, the management of one or more remote sessions corresponding to a software application, such as a virtual desktop instance, one skilled in the art will appreciate that the techniques disclosed herein may be applied to any number of software processes including, but not limited to, operating system processes and services. Further, although various aspects of the disclosure will be described with regard to illustrative examples and embodiments, one skilled in the art will appreciate that the disclosed embodiments and examples should not be construed as limiting unless otherwise stated.

For purposes of discussion, the combination of components such as an operating system, virtual desktop configuration, and one or more applications for a user and/or client device will be referred to herein as a "workspace." A workspace can be generated for a specific user, as may be configurable by that user, or can be generated for a number, group, or type of user, as may be distributed to employees accessing computing resources via an enterprise system.

As discussed, it will often be the case that the operating system will need to be upgraded, patched, and/or otherwise modified for various workspaces. Using a conventional approach, a virtual desktop image, or virtual machine image, is used to generate and/or provide a virtual desktop or other virtual machine for a user. When upgrading the software, a new virtual image can be created, when then can be used to generate an updated virtual machine or virtual desktop when the user next logs into, or otherwise accesses, the virtual desktop, etc. As discussed, however, upgrading the OS or making other major upgrades or changes can negatively impact other applications or processes, such that those changes have to be undone, which can involve attempting to generate another machine image that does away with some or all of the changes, and causes the other applications to again function as expected and/or desired. When there are multiple users and/or applications, this can involve a significant amount of time and effort.

Figure 2:
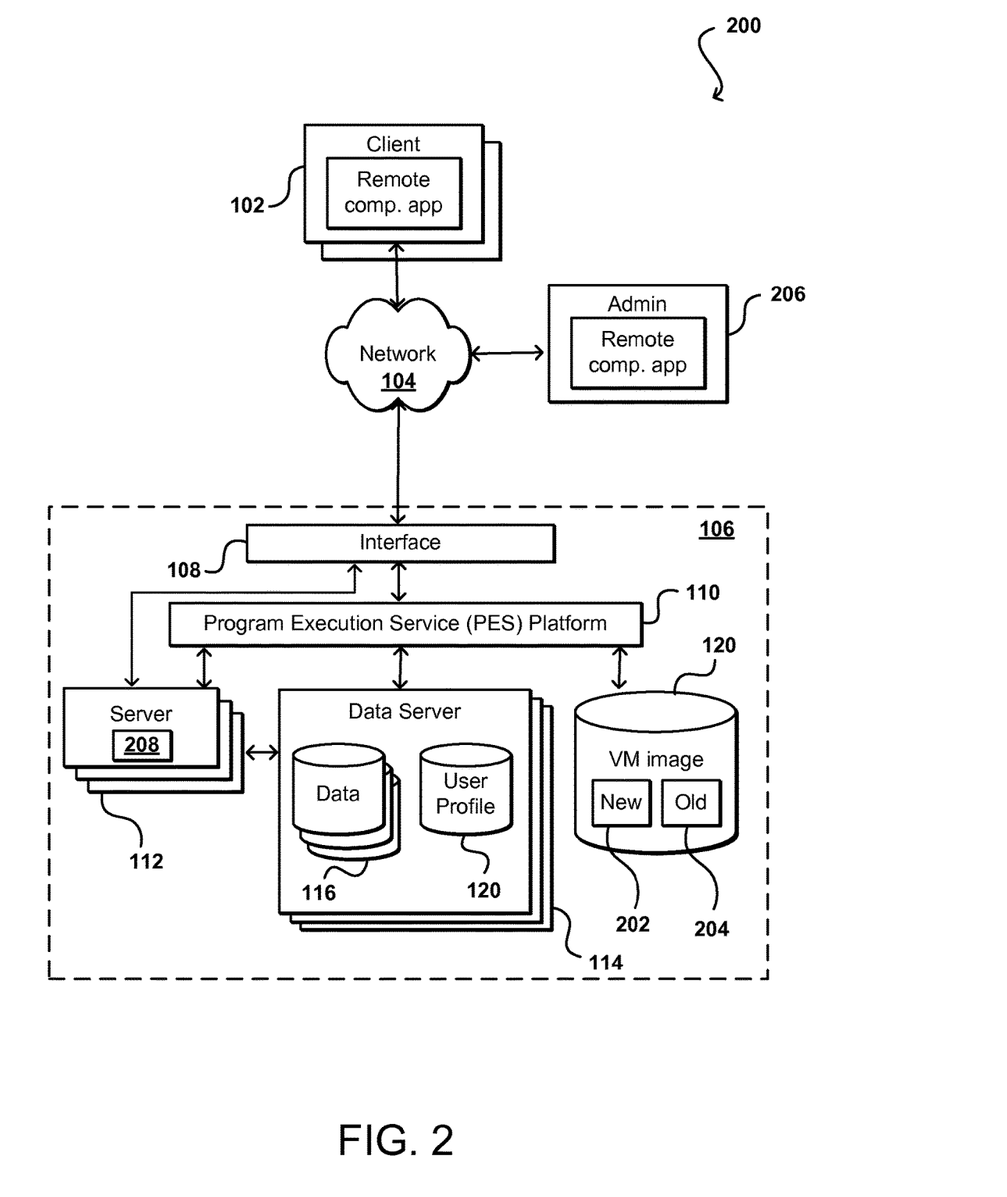
FIG. 2 illustrates an example situation in which multiple workspace images are created, enabling a software change to quickly be undone in accordance with various embodiments.

In order to minimize the impact and downtime to users, as well as to minimize the cost and effort needed to undo upgrades or changes, and provide various other benefits, approaches in accordance with various embodiments can retain a copy of a current and/or prior machine image before switching a user over to a virtual desktop or other such workspace corresponding to a new and/or updated machine image. As an example, FIG. 2 illustrates an example situation 200 wherein a new machine image 202 is generated for a user (or group of users, etc.), while a copy 204 of the current (or "old") machine image is stored, at least for a period of time or until the new image is verified to work appropriately, among other such options. In this example, the user can log off from a virtual instance 208, virtual desktop, or other such workspace, executing on, or hosted by, one or more servers 112, which corresponded to the old virtual machine image 204. The user can then utilize the remote computing application on the client device 102, or another client device associated with the user, to login or otherwise provide an appropriate request to access the virtual instance 208. As discussed elsewhere herein, this can include providing one or more credentials or other such information that can be validated by one or more components or services of the provider environment 106. It should be understood that reference numbers for similar elements can be carried over between figures for ease of explanation, but that such usage should not be interpreted as a limitation on the various embodiments unless otherwise stated.

When the request is received and determined to correspond to an authenticated user authorized to access the virtual instance 208, such as may involve comparing information submitted with the request to information stored in the user profile data store 120, an updated version of the virtual instance can be instantiated via the PES platform 110 using the new machine image 202. A data store for the user, as may include various documents and files accessible via the virtual instance 208, then can be attached to the virtual instance corresponding to the new machine image 202. With the machine instance launched with the new machine image and the data store attached, one or more compatibility checks or other such processes can be executed to determine whether the new workspace corresponding to the new machine image is compatible with other applications and/or functionality needed and/or used with the workspace. If one or more checks fail, or another such event occurs, a determination can be made that the update should be rolled back, or the workspace should otherwise revert to its previous state. In at least some embodiments, a user can also notice or determine that the new workspace is not functioning as desired, or that an application is not working with the new workspace, or the user is otherwise not satisfied with the change, and the user can manually request a rollback to the previous workspace. If a rollback is required, instead of having to attempt to generate an appropriate image, the user can be requested to log out (or automatically logged out) and the data store can be detached from the virtual instance 208. The PES platform 110 then can cause the virtual instance 208 for the user to be launched (on the same or a different server 112) using the old virtual machine image 204. The data store then can be reattached to the virtual instance. The virtual instance will then effectively be the same as before the attempted upgrade. When the user subsequently accesses the workspace, the workspace should operate as before, with no negative impact due to the attempted upgrade. The rollback process is thus effectively just another image change, except in this example the virtual instance is launched with a machine image corresponding to a previous workspace version instead of a newer one, resulting in very little downtime or unavailability for the user.

As discussed, new machine images can be created for a number of different purposes. These can include, for example, upgrades, patches, or other changes or new version installations of an operating system, or even a switch to a different operating system for a virtual workspace. These can also include, for example, changes to applications or functionality available through the workspace, or installation or removal of specific applications or functionality, among other such options. In some embodiments, different types of users, groups of users, etc., might have different permissions, and a new machine image might be used to change a user to a different type of user with different permissions, OS version, applications or functionality, etc.

In some cases, however, the upgrade might result in changes to the data store for the user as well. For example, a change in the operating system or an application might come with new file formats, or might support functionality that was not supported in the previous workspace. If these changes are made automatically, or if the user causes certain changes to be made before the user notices that a rollback is needed or a rollback is otherwise triggered, then the rollback can either require managing the changes to the data or risk losing data by reverting to the previous workspace.

Figure 3:
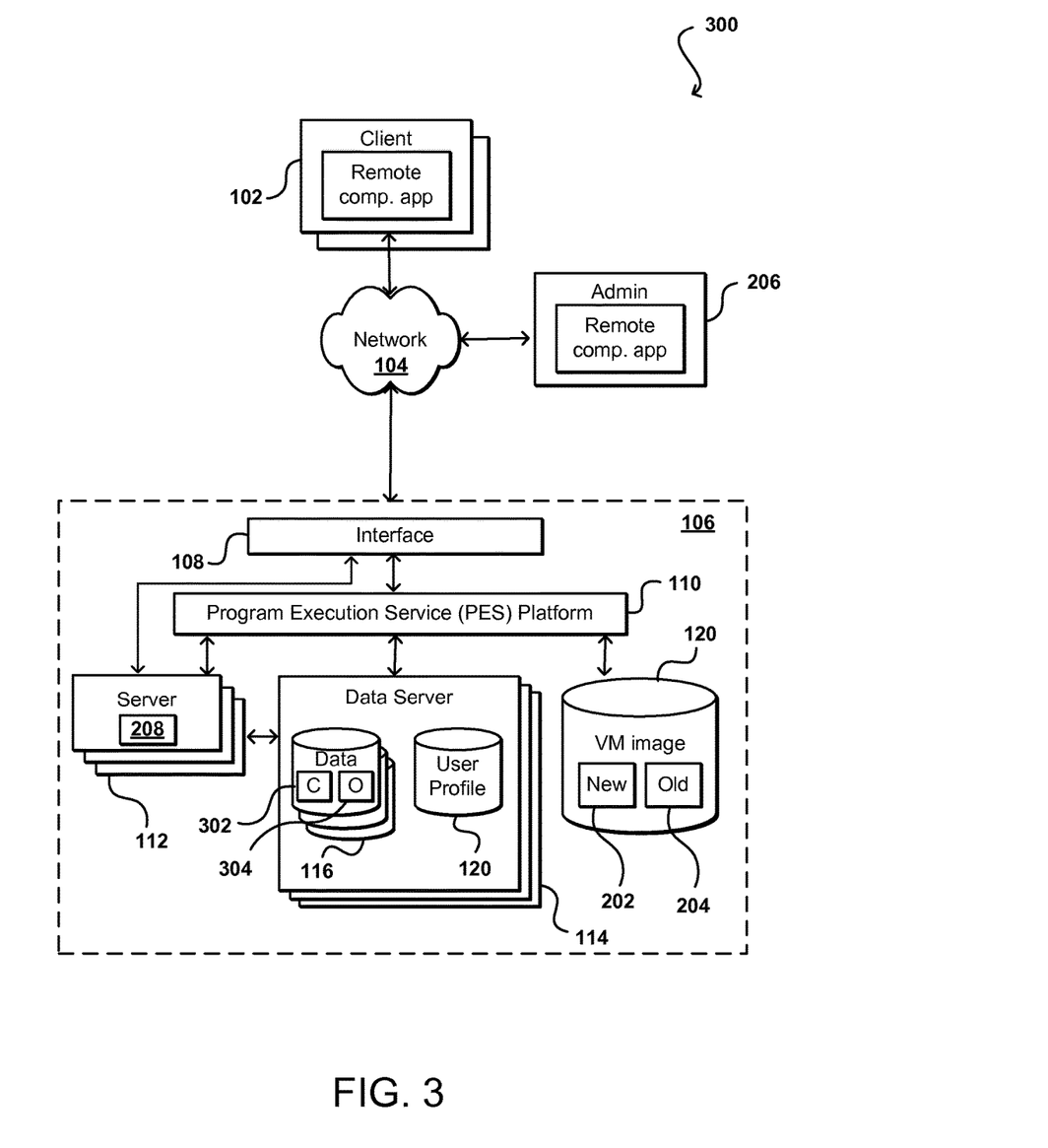
FIG. 3 illustrates an example situation in which a copy of a data store can be used with a new workspace image, such that changes to the workspace and/or data store can quickly be undone or returned to a previous state in accordance with various embodiments.

Accordingly, approaches in accordance with various embodiments can also utilize multiple copies of the user data store to attempt to minimize data loss or corruption as a result of a change in machine image or other such aspect. For example, FIG. 3 illustrates an example situation 300 wherein an upgrade to a new virtual workspace has occurred. In this example, a new virtual image 202 has again been created to be used to launch an updated virtual instance 208 for the user, while retaining a copy of the old machine image 204 in case a rollback is needed. Instead of detaching the user data store from the old version of the machine instance and attaching after the updated machine instance is launched, however, a snapshot of the original data store 304 for the user is taken, and used to generate a copy 302 of the data store at approximately the point in time when the new machine image 202 is used to launch the virtual instance 208. In this way, the state of the data before the update can be retained such that, if a rollback to the previous workspace is performed, that workspace can utilize the previous version of the data store as well. In effect, no changes will have occurred as a result of the attempted upgrade of the workspace.

It is possible, however, that some data or information may have been added via the new workspace before the rollback was triggered. Accordingly, approaches in accordance with various embodiments can store a set of changes, or deltas, since the update, for at least a period of time or other such period. This information can be stored to any appropriate data store 116 or other such location. If a rollback is performed, the PES platform then can attempt to merge and/or apply the changes of the delta to the original data store 304. In cases where an automatic merge cannot be performed, the user can be presented with information about those changes to attempt to enable the user to save that data, whether by doing a manual manipulation, processing with an application, or obtaining another copy of that data, among other such options. In most situations a rollback will occur within a short period of time of an attempted upgrade, such that loss and/or corruption of data should be minimized in most cases. Such an approach also prevents the need for data format changes, and other such processing, which reduces the time needed for a workspace change and improves the overall user experience accordingly.

As discussed, such approaches can be beneficial for applications such as virtual desktops and virtual workspaces. These approaches can also be beneficial for environments such as enterprises, where multiple users of different type need to be provisioned on different workspaces or on workspaces with different applications and/or permissions, etc. A hosted virtual desktop service such as PES thus can be used to provide for simplified updating and rollback of patches, upgrades, and other such software changes. Such an approach also can be used when attempting to launch instances on new hardware, where new configuration or other such information might be needed, and applications might not function properly on the new hardware. In some embodiments a user might utilize different types of devices with different capabilities to access a virtual desktop, and different virtual images might be needed for at least some of those devices. For example, a different virtual image might be used for a small smart watch than for a large smart television, etc.

Figure 4:
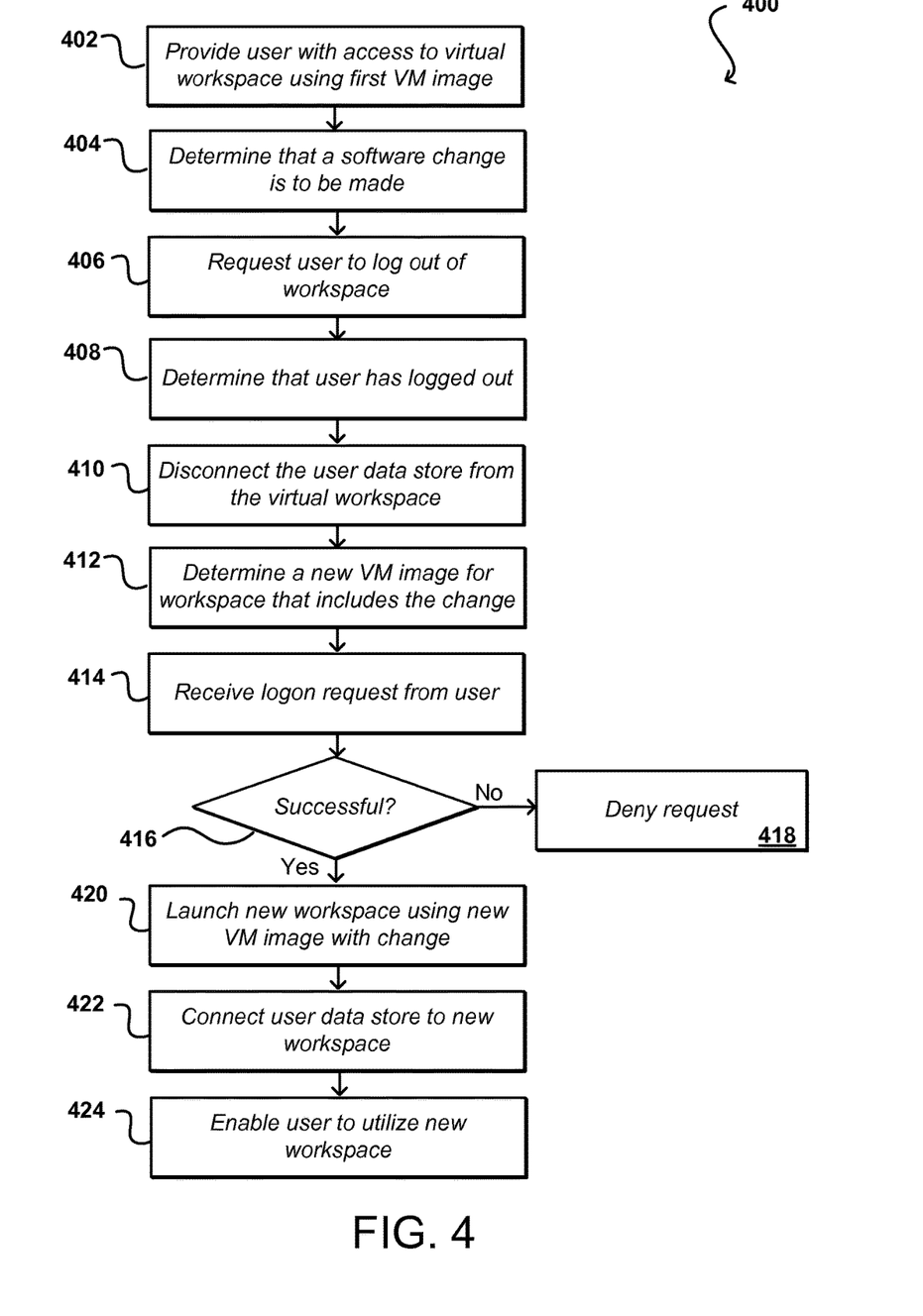
FIG. 4 illustrates an example process for performing a virtual machine upgrade that can be utilized in accordance with various embodiments.

FIG. 4 illustrates an example of a process 400 for updating software for a virtual workspace that can be utilized in accordance with various embodiments. It should be understood that, for various processes discussed herein, there can be additional, fewer, or alternative steps performed in similar or alternative orders, or at least partially in parallel, in accordance with the various embodiments unless otherwise stated. In this example, a user is provided 402 with access to a virtual workspace launched using a first machine image. As discussed, the machine image can include any appropriate information, such as an operating system and one or more applications. The virtual workspace also can be associated with a data store for storing user data for the virtual workspace. A determination can be made 404 that a change to software for the virtual workspace is to be performed for the user. As discussed, this can include an upgrade, patch, or change in version for the operating system or an application for the workspace, among other such combinations or options. Further, the change can be for a single user or group of users, as discussed elsewhere herein.

A request can be made 406 for the user to log out of the current virtual workspace. Upon determining 408 that the user has logged off, the data store can be detached 410 from the virtual workspace and an appropriate new machine image determined 412, where that machine image includes the necessary information for the workspace along with the desired change(s). A subsequent logon can be received 414 from the user. If the logon attempt is determined 416 to not be successful, the logon request can be denied 418. If the request is successful, a new virtual workspace can be launched 420 using the new machine image. The data store can be attached 422 to the new workspace, and the user can be enabled 424 to begin utilizing the new workspace. As discussed, changes to the workspace can be made for other reasons as well, such as to change hardware, configure the workspace for a different type of user with different permissions, etc.

Figure 5:
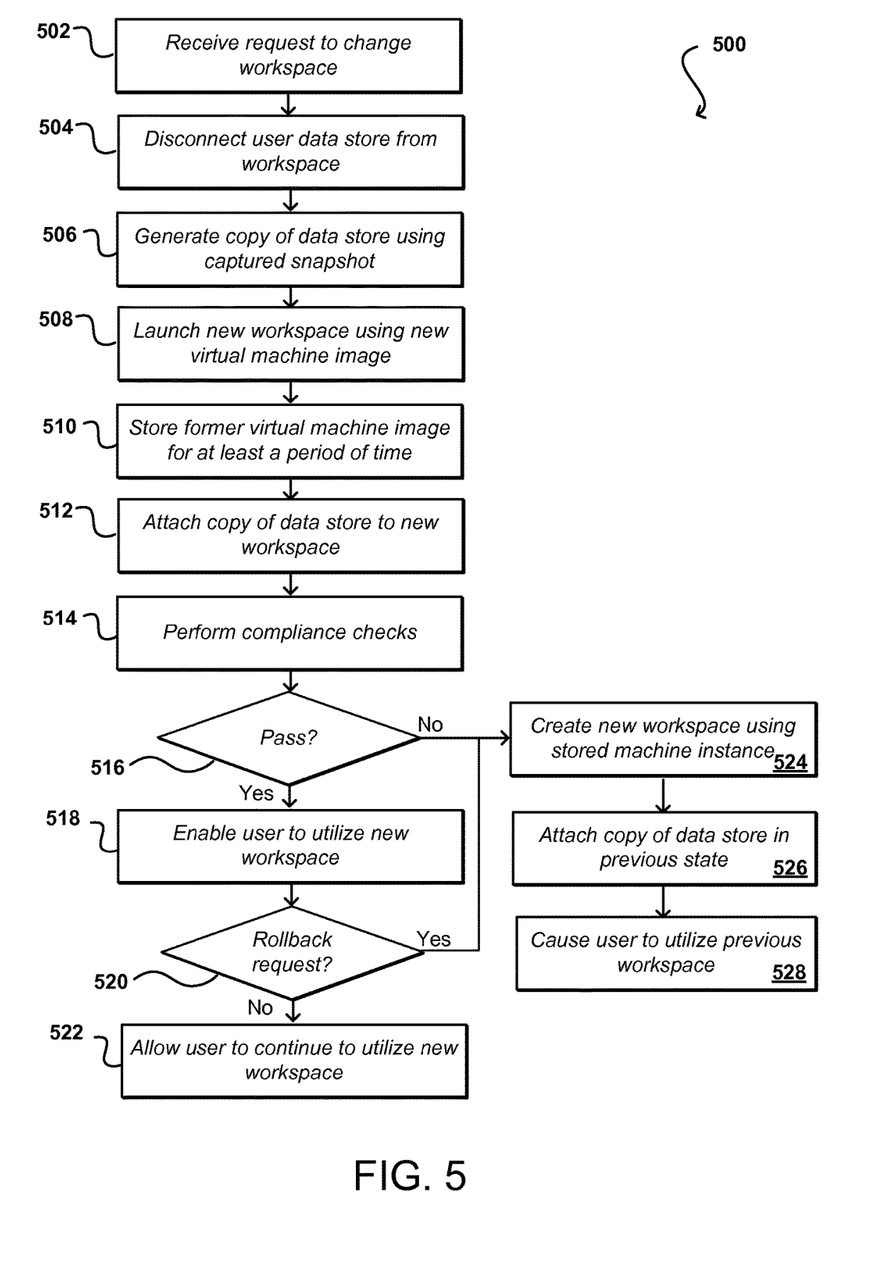
FIG. 5 illustrates an example process for rolling back a virtual machine upgrade that can be utilized in accordance with various embodiments.

FIG. 5 shows an example process 500 for rolling back or undoing such a change that can be utilized in accordance with various embodiments. In this example, a request to change the workspace is received 502. In response, the data store for the user is detached 504 from the workspace and a copy of the data store is generated 506 using a snapshot. As discussed, copies of the data store are not used in all embodiments, but can help to quickly restore the workspace back to the previous state. A new machine image is used to launch 508 a new virtual instance, supporting the workspace for the user, and the former machine image is stored 510 for at least a period of time. The copy of the data store is attached 512 to the new virtual instance, and a set of compliance checks are performed 514. If the new virtual instance is determined 516 to pass the checks, the user can be enabled 518 to utilize the new workspace. If the user is unhappy with any aspect of the new workspace, a selection can be received 520 to rollback the change. In some embodiments, the user can designate a time and/or version to which the user wants to return. If not, the user can be allowed 522 to utilize the new workspace.

If the new workspace failed one or more of the checks, or if the user decided to rollback the change, a new virtual instance can be created 524 using the former machine instance and the old data store for the user, from the time of the last change, can be attached 526, causing a virtual instance to be available that is in the state of the workspace before the change. The user then can be caused 528 to utilize the workspace in the previous state, such as by asking the user to logout and then log back in, which will cause the user to automatically be directed to the original virtual workspace in this example. As discussed, the upgrade, rollback, and management thereof can be performed using a PES platform or service, or other such component or system.

In order to control the workspaces, images, user groups, and other such information, a management console and/or portal can also be exposed through, or connected to, a PES platform. An example of an administrative device 206 operable to call into the provider environment 106 and access a management console through a PES platform is illustrated in FIG. 2. A management console can allow an administrator to perform functions such as to add users, define groups or pools of users, or types of users, and indicate the software and/or version information that is applicable to each. The console can also enable an administrator to monitor and/or manage the virtual machine images that are available and/or created, or can cause a new image to be created any time a change is indicated to be propagated to one or more users, or groups of users, via the PES platform. The console can enable an administrator or other such user to monitor progress of various changes and/or the status of compliance checks, and can enable the administrator to select a rollback of any of the changes. In an enterprise environment, for example, the console can also enable the administrator to perform a staggered rollout, where changes are propagated to different groups of users at different times, or a single rollout, where a new virtual image is applied to all appropriate users, who will receive the changes upon their next login. Different groups can have different versions or builds, and/or can utilize different workspace images. Various other options and configurations can be used as well within the scope of the various embodiments.

Figure 6:
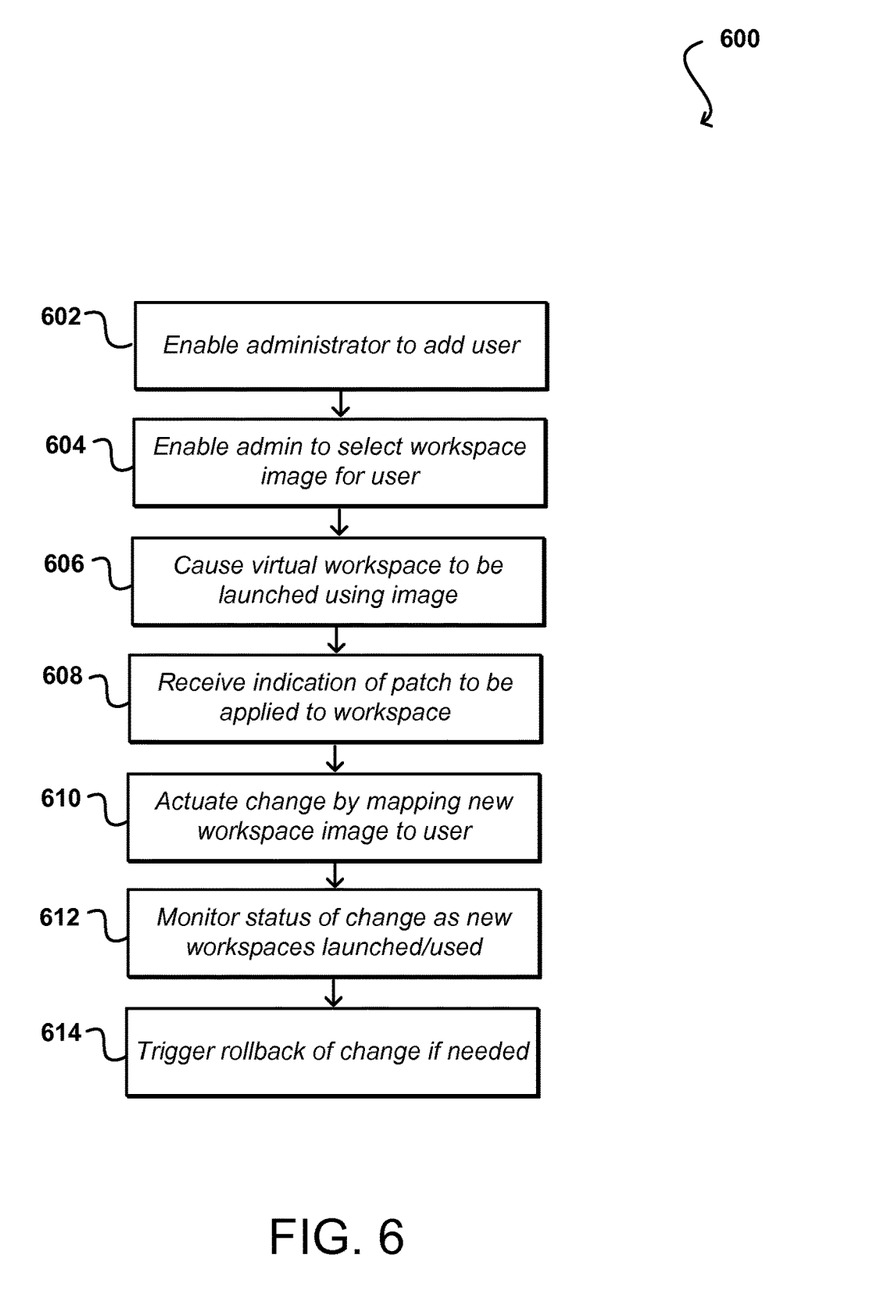
FIG. 6 illustrates an example process for managing upgrades that can be utilized in accordance with various embodiments.

FIG. 6 illustrates an example process 600 for enabling an administrator or other such party to trigger a workspace change in accordance with various embodiments. In this example, an administrator can utilize a management console or other such component to add 602 a user to the system. The administrator can select 604 a workspace to be applied to the user, and can cause 606 a virtual workspace to be launched for that user, including an associated data store. The administrator can subsequently indicate 608 that at least one patch or other such change is to be applied to the workspace for that user and any other user(s) in the same group, pool, type, etc. The administrator can subsequently actuate 610 the change, at which time a new virtual image can be mapped to the user, or a group to which the user belongs and the workplace is associated. The administrator can monitor 612 the status of the change through the console, such as by monitoring the status of the compliance checks for different machines and/or users. The administrator can trigger 614 a rollback of the change if any compliance issues are detected or reported by the users or devices. Various other such tasks can be performed as well as discussed and suggested elsewhere herein. For example, an administrator can add patches and updates to be deployed, and then can schedule any such changes to be deployed at regular intervals or specified times, etc.

Figure 7:
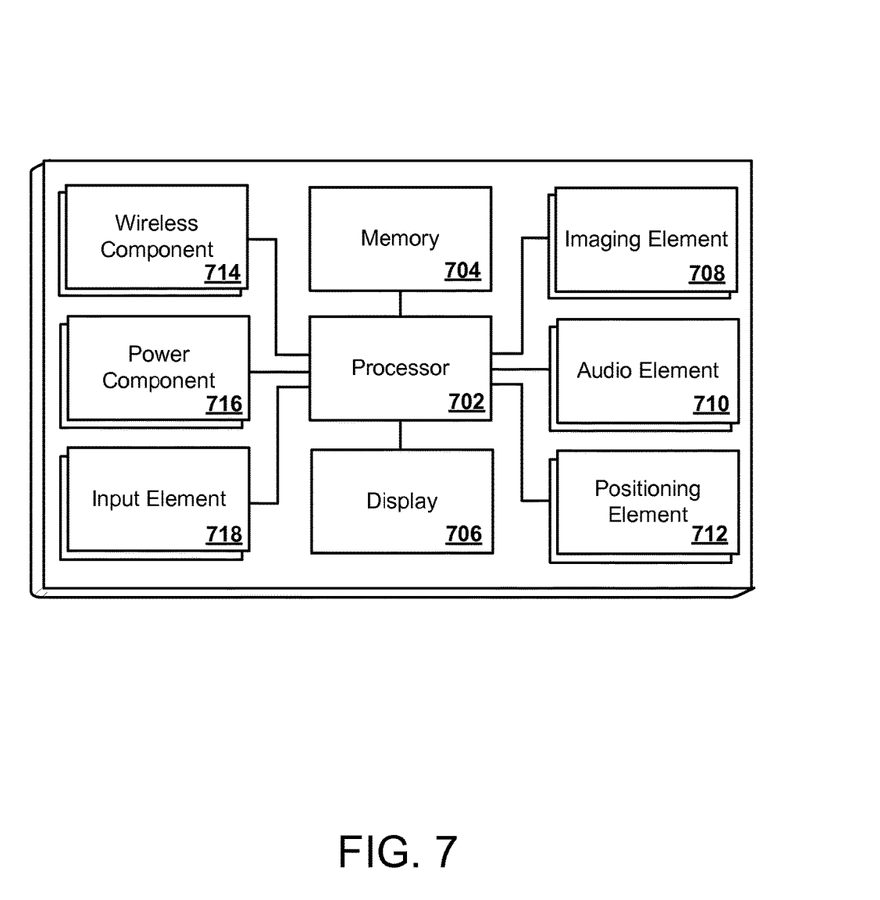
FIG. 7 illustrates an example set of basic components of a portable computing device that can be used in accordance with various embodiments.

In order to provide functionality described herein, FIG. 7 illustrates an example set of basic components of a computing device 700 that can be utilized in accordance with various embodiments. In this example, the device includes at least one processor 702 for executing instructions that can be stored in at least one memory device or element 704. As would be apparent to one of ordinary skill in the art, the device can include many types of memory, data storage or computer-readable storage media, such as a first data storage for program instructions for execution by the processor 702, the same or separate storage can be used for images or data, a removable storage memory can be available for sharing information with other devices, etc.

The device can include some type of display element 706, such as a touch screen, electronic ink (e-ink), organic light emitting diode (OLED) or liquid crystal display (LCD), although devices such as portable media players might convey information via other means, such as through audio speakers. The device can include at least one image capture element 708, such as one or more cameras that are able to image a user, people, or objects in the vicinity of the device. The device can also, or alternatively, include at least one audio element 710, such as one or more audio speakers and/or microphones. The microphones may be used to facilitate voice-enabled functions, such as voice recognition, digital recording, etc. The audio speakers may perform audio output. In some embodiments, the audio speaker(s) may reside separately from the device. The device, as described above relating to many embodiments, may also include at least one positioning element 712 that provides information such as a position, direction, motion, or orientation of the device. This positioning element 712 can include, for example, accelerometers, inertial sensors, electronic gyroscopes, electronic compasses, and GPS elements.

The device can include at least one additional input device 718 that is able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

The example device also includes one or more wireless components 714 operable to communicate with one or more portable computing devices within a communication range of the particular wireless channel. The wireless channel can be any appropriate channel used to enable devices to communicate wirelessly, such as Bluetooth, cellular, or Wi-Fi channels. It should be understood that the device can have one or more conventional wired communications connections as known in the art. The example device includes various power components 716 known in the art for providing power to a computing device, which can include capacitive charging elements for use with a power pad or similar device as discussed elsewhere herein. The example device also can include at least one touch and/or pressure sensitive element 718, capable of providing touch- or pressure-based input to the device, etc. In some embodiments this material can be used to determine motion, such as of the device or a user's finger, for example, while in other embodiments the material will be used to provide specific inputs or commands.

The various embodiments can be implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate storage media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
    hosting a virtual desktop that executes a first virtual machine instance on a computing device of a multi-tenant resource environment, the first virtual machine instance being based at least in part upon a first virtual machine image that includes an operating system and an application;
    as a result of determining that a change is to be made to the virtual desktop that includes an update to the operating system, prompting a user to log out of the virtual desktop;
    as a result of receiving a response to the prompting, generating a second virtual machine image that includes the operating system, the application, and the change;
    detaching a data store from the first virtual machine instance;
    in response to a successful attempt by the user to log into the virtual desktop, launching, using the second virtual machine image, a second virtual machine instance to execute the virtual desktop with the change;
    creating a backup copy of the data store;
    attaching the data store to the second virtual machine instance;
    as a result of attaching the data store, executing a compatibility test on the application supported by the second virtual machine instance with respect to the virtual desktop with the change; and
    in response to a failure of the compatibility test:
        automatically logging the user out of the virtual desktop;
        detaching the data store from the second virtual machine instance;
        launching a third virtual machine instance based at least in part on the first virtual machine image;
        executing the virtual desktop using the third virtual machine instance;
        attaching the backup copy of the data store to the third virtual machine instance such that the virtual desktop is accessible in a state of the virtual desktop prior to the change; and
        logging the user into the virtual desktop.

2. The computer-implemented method of claim 1, further comprising causing the third virtual machine instance to be launched in response to receiving a request from the user of the virtual desktop to roll back the change.

3. The computer-implemented method of claim 1, wherein creating the backup copy includes:
    capturing a snapshot of the data store before attaching the data store to the second virtual machine instance at a point in time after the second virtual machine instance is used to launch the virtual desktop; and
    creating the backup copy of the data store using the snapshot, the backup copy representing a state of the data store prior to the change.

4. The computer-implemented method of claim 1, wherein a subsequent successful login attempt by the user allows access to the virtual desktop executing on the third virtual machine instance.

5. The computer-implemented method of claim 1, wherein the compatibility test includes a set of compliance checks.

6. The computer-implemented method of claim 1, wherein prompting the user to log out occurs before the change is included with the second virtual machine image.

7. A system, comprising:
    one or more processors; and
    memory including executable instructions that, as a result of being executed by the one or more processors, cause the system to:
        host a virtual desktop that executes a first virtual machine instance on a computing device of a multi-tenant resource environment, the first virtual machine instance being based at least in part upon a first virtual machine image that includes an operating system and an application;
as a result of a determination that a change is to be made to the virtual desktop that includes an update to the operating system, prompt a user to log out of the virtual desktop;
as a result of receipt of a response to the prompt, generate a second virtual machine image that includes the operating system, the application, and the change;
detach a data store from the first virtual machine instance;
in response to a successful attempt by the user to log into the virtual desktop, launch, using the second virtual machine image, a second virtual machine instance to execute the virtual desktop with the change;
create a backup copy of the data store;
attach the data store to the second virtual machine instance;
as a result of attaching the data store, execute a compatibility test on the application supported by the second virtual machine instance with respect to the virtual desktop with the change; and
in response to a failure of the compatibility test:
automatically log the user out of the virtual desktop;
detach the data store from the second virtual machine instance;
launch a third virtual machine instance based at least in part on the first virtual machine image;
execute the virtual desktop using the third virtual machine instance;
attach the backup copy of the data store to the third virtual machine instance, such that the virtual desktop is accessible in a state of the virtual desktop prior to the change; and
log the user into the virtual desktop.

8. The system of claim 7, wherein:
the first virtual machine image corresponds to a first virtual workspace; and
the executable instructions further comprise instructions that, as a result of the successful attempt to log into the virtual desktop, cause the system to:
detach the data store from the first virtual machine instance and attach the data store to the second virtual machine instance after the user logs out of the first virtual workspace; and
enable the user to access a second virtual workspace of the second virtual machine instance in response to a subsequent successful login, the second virtual workspace configured to access data in the data store.

9. The system of claim 7, wherein the executable instructions further comprise instructions that cause the system to detach the data store from the second virtual machine instance and attach the data store, or a copy of the data store to the third virtual machine instance, the copy of the data store representing a prior state of the data store.

10. The system of claim 7, wherein at least two of the first virtual machine instance, the second virtual machine instance, and/or the third virtual machine instance executes on a same computing device.

11. The system of claim 7, wherein:
the user is a member of a pool of users associated with the first virtual machine image; and
each user of the pool of users accesses a current version of a workspace that includes the operating system and the application, the current version corresponding, dependent upon a determination of a problem with performance of the second virtual machine instance, to the second virtual machine image or the first virtual machine image.

12. The system of claim 11, wherein the executable instructions further comprise instructions that cause the system to provide a management portal enabling a party to:
define at least one of the user or the pool of users; and
associate the at least one of the user or the pool of users with the first virtual machine image.

13. The system of claim 12, wherein the management portal further enables the party to launch at least one of the second virtual machine instance or the third virtual machine instance.

14. The system of claim 7, wherein the executable instructions further comprise instructions that, in response to receipt of a request from the user to undo the change, cause the system to:
execute the third virtual machine instance of the multi-tenant resource environment; and
grant access to the user to the third virtual machine instance.

15. The system of claim 14, wherein the executable instructions further comprise instructions that cause the system to enable the user to specify a point in time to which to revert a workspace associated with the second virtual machine instance, wherein the third virtual machine instance is attached to the data store including data corresponding to a state of data at the point in time.

16. A non-transitory computer-readable storage medium including instructions that, if executed by at least one processor of a computer system, cause the computer system to:
host a virtual desktop that executes a first virtual machine instance on a computing device of a multi-tenant resource environment, the first virtual machine instance being based at least in part upon a first virtual machine image that includes an operating system and an application;
as a result of a determination that a change is to be made to the virtual desktop that includes an update to the operating system, prompt a user to log out of the virtual desktop;
as a result of receipt of a response to the prompt, generate a second virtual machine image that includes the operating system, the application, and the change;
detach a data store from the first virtual machine instance;
in response to a successful attempt by the user to log into the virtual desktop, launch, using the second virtual machine image, a second virtual machine instance to execute the virtual desktop with the change;
create a backup copy of the data store;
attach the data store to the second virtual machine instance;
as a result of attaching the data store, execute a compatibility test on the application supported by the second virtual machine instance with respect to the virtual desktop with the change; and
in response to a failure of the compatibility test:
automatically log the user out of the virtual desktop;
detach the data store from the second virtual machine instance;
launch a third virtual machine instance based at least in part on the first virtual machine image;
execute the virtual desktop using the third virtual machine instance;

attach the backup copy of the data store to the third virtual machine instance, such that the virtual desktop is accessible in a state of the virtual desktop prior to the change; and log the user into the virtual desktop.

17. The non-transitory computer-readable storage medium of claim 16, wherein the instructions further cause the computer system to cause the data store to be attached to the third virtual machine instance in response to the third virtual machine instance being launched.

18. The non-transitory computer-readable storage medium of claim 16, wherein the instructions further cause the computer system to:

schedule periodic updates to the virtual desktop, each of the periodic updates including at least:
 a patch to the operating system or the application,
 an update to the operating system or the application,
 a version change of the operating system or the application,
 an addition to the operating system or the application,
 a change to the operating system or the application, and/or
 a deletion of the operating system or the application; and generate a new virtual machine image for each of the periodic updates.

19. The non-transitory computer-readable storage medium of claim 16, wherein the instructions further cause the computer system to:

generate a user interface for the virtual desktop while executing; and cause a virtual interface to be displayed on a client device operated by the user.

20. The non-transitory computer-readable storage medium of claim 16, wherein the instructions further cause the computer system to determine an issue with the change includes at least one of detecting an incompatibility using a testing process or receiving an indication from the user.

21. The non-transitory computer-readable storage medium of claim 16, wherein the instructions further cause the computer system to:

determine a plurality of user pools; and associate each user pool of the plurality of user pools with one of a plurality of virtual machine images, each of the plurality of virtual machine images being used to generate a respective workspace for a respective user of a user pool.

22. The non-transitory computer-readable storage medium of claim 16, wherein the instructions further cause the computer system to enable a respective user of a user pool to customize a respective workspace, data for a customization being used with the respective workspace being independent of which virtual machine is executing the virtual desktop.

* * * * *